Dec. 9, 1941.    G. WELANDER    2,265,658
FOOD SHREDDING APPARATUS
Filed May 9, 1939    2 Sheets-Sheet 1
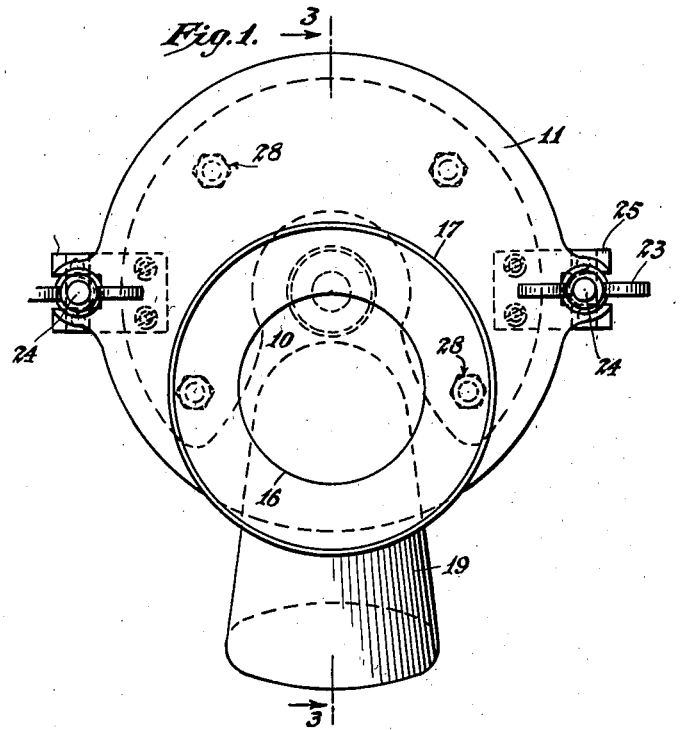
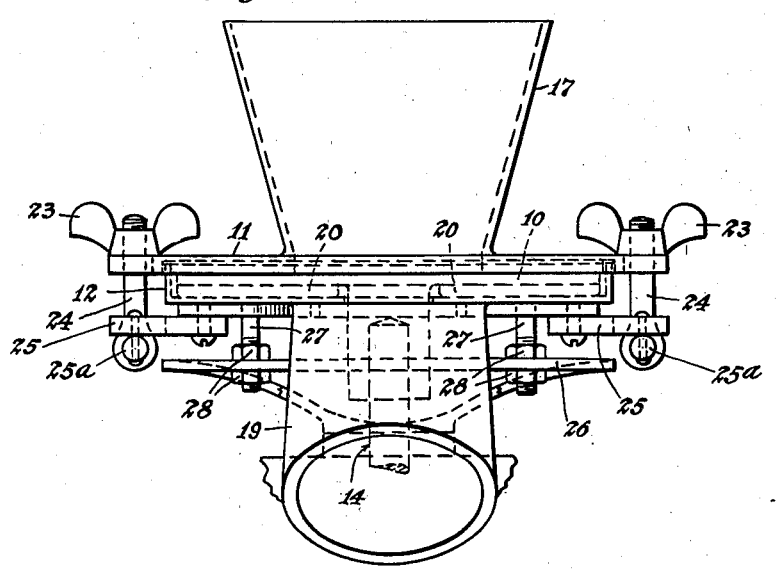
INVENTOR
Gustave Welander
BY
ATTORNEY

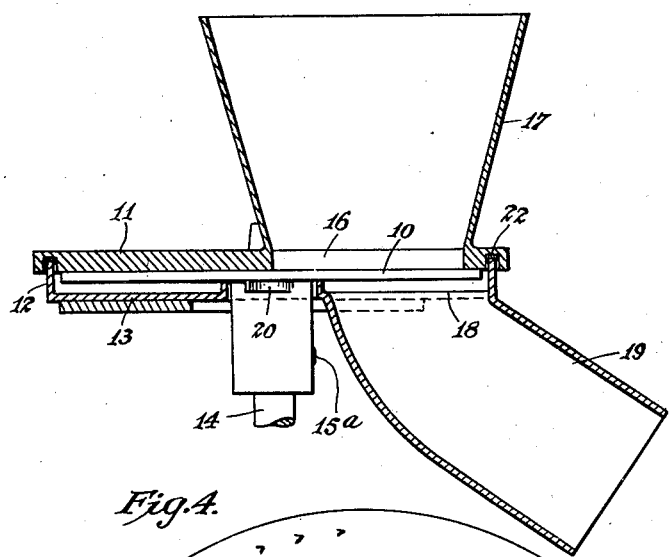
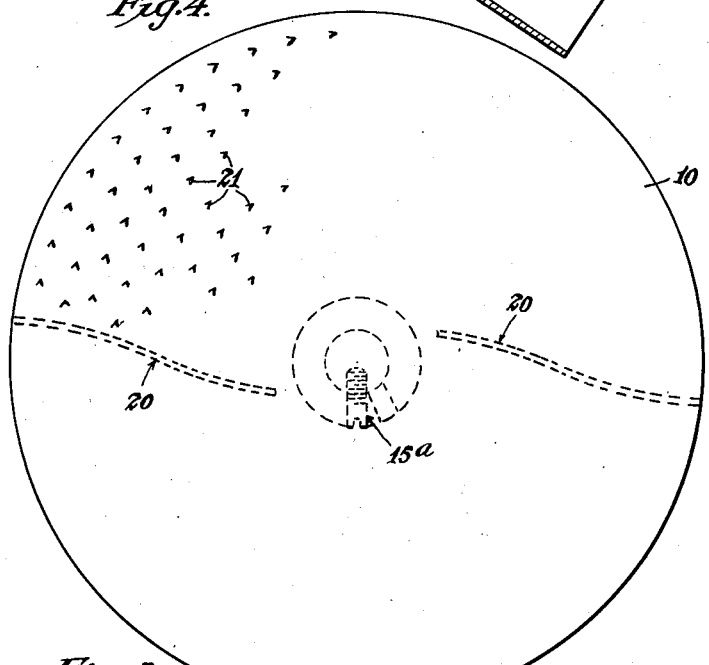
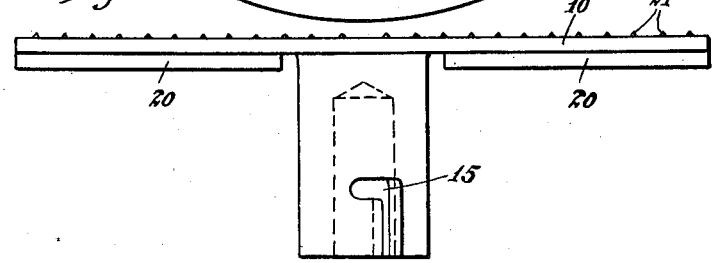

Patented Dec. 9, 1941

2,265,658

UNITED STATES PATENT OFFICE 2,265,658

FOOD SHREDDING APPARATUS

Gustave Welander, Arlington, N. J.

Application May 9, 1939, Serial No. 272,557

7 Claims. (Cl. 146—124)

This invention relates to a device for cutting and shredding vegetables and other food products and has for its object to provide an improved device of this class, adapted for finely cutting various types of food products, including the leafy parts of celery, spinach and other leafy vegetables.

Another object is to provide an improved device of this type which is simple in construction and yet adapted for rugged wear and use. A further object is to provide such a device that is capable of being quickly taken apart for washing and cleaning. Yet another object is to provide a simple means for compensating for wear and controlling the spacing between the face of the cutting disc and its adjacent wall.

Referring to the drawings,

Fig. 1 is a top plan view of one embodiment of this invention.

Fig. 2 is a side view of the device of Fig. 1.

Fig. 3 is a section on the line 3—3 of Fig. 1.

Fig. 4 is the top plan view of the cutting disc.

Fig. 5 is a side view of the device of Fig. 4.

In the embodiment illustrated the rotatable cutting disc 10 has a closely adjacent stationary top wall 11, a peripheral side wall 12, and a bottom wall 13. These walls enclose the cutting disc except where the driving shaft 14 passes through the bottom wall 13 and where the material is supplied and discharged to and from the device. The disc 10 has a projecting portion adapted to fit over the motor shaft 14, such portion being provided with bayonet slot 15 for reception of the projection or locking pin 15—a, by means of which the cutting disc may be quickly and easily removed from the motor shaft 14.

An opening 16 is provided in the top wall 11, through which material may be supplied to the cutting disc 10 from a hopper 17. This hopper may be integral with or secured to the top wall 11.

The bottom wall 13 is also provided with an opening 18 from which leads off the discharge passage 19. Vanes 20 are located on the under side of the cutting disc.

The top of the disc is provided with a large number of rasp-like teeth 21 throughout substantially the full area of the disc. An appropriate packing strip 22 is provided between the peripheral walls 12 and the top wall 11, the walls 12 being shown as being integral with the bottom wall 13. Suitable wing nuts 23 engage pivotally mounted bolts 24 for retaining the top wall 11 clamped against the top of the peripheral wall 12. The bolts 24 are shown as being provided with a pivotal support 25—a secured beneath the extension 25 on the casing. The extension 26 from the motor casing provides a support for the bolts 27 by means of which the casing for the cutting disc may be adjusted in height with respect to the supporting extension 26 by means of the nuts 28.

The rasp-like teeth are preferably of substantially the same height and the top wall 11 is located so close to these rasp-like teeth that leafy materials like spinach, celery leaves, etc., will be shredded and cut in passing through this device. Difficulty has heretofore been experienced with some of the prior devices of this class for the reason that the leafy materials are not cut as satisfactorily as they should be. One feature of this invention includes the making of the rasp teeth so close to the top blade that these leafy materials will be cut and well shredded, there being no chance for the leafy substances to be passed between the tops of the teeth and the top wall. The cutting disc is preferably imperforate. As the material is supplied to the cutting disc, it is finely ground or shredded by the teeth 21 and then the cut material is directed by centrifugal force toward the periphery of the disc. As shown in Fig. 3, the periphery of this disc is preferably spaced a short distance from the peripheral walls 12 so that the cut material, after reaching the edge of the disc 10, may be thrown off by centrifugal force and fall by gravity to the peripheral portion of the bottom plate 13. The vanes 20, located on the under side of the cutting disc 10 (shown in dotted lines in Fig. 4) function to direct the grated or cut material radially inward to some extent, but at least these vanes direct the cut material toward the opening 18 and the discharge passage 19. After being discharged the material is preferably collected in any suitable manner, used for salads, for cooking, or the cut material may be put in a press for extracting a major portion of the liquids or juices. Such liquids make a healthful, natural beverage.

The spacing or clearance between the tops of the rasp teeth 21 and the bottom of the top wall 11 may be adjusted by means of the nuts 28 on the supporting bolts 27. Raising the bolts 27 causes the casing of the cutting disc to be raised with respect to the disc, or, in other words, causes the clearance between the cutting teeth 21 and the top plate 11 to be increased. Conversely, lowering the bolts 27 diminishes this clearance. It should be understood the cutting disc is mounted on the motor shaft and therefore this disc is supported by the bearing or bearings of the motor shaft. In case of wear in these bearings, adjustment of the nuts and bolts 27 and 28 may compensate for such wear and adjust the clearance to the desired amount above the cutting teeth. By loosening the wing nuts 23 and swinging bolts 24 outwardly away from the axis of the motor shaft, the top plate 11 may be removed or taken off the peripheral supporting walls 12. Of course, the hopper 17 comes off with the top wall 11. After this the cutting disc 10 may be removed from the motor shaft 14 by means of the bayonet slot and screw or other projection 15—a. In this way it will be possible to quickly and easily clean this device on the cutting disc and on the casing walls on each side of it.

Among the advantages of this invention may be mentioned the close fit between the cutting teeth and the top or adjacent wall. While the device has been illustrated with the cutting disc horizontal, such position should not be always necessary. Another feature is believed to be the centrifugal urging of the cut material from between the rasp teeth radially outward and around the edge of the cutting disc. The feed vanes direct the pulp or cut material to the outlet. This cutting device is sanitary and may be easily kept clean. It is easy to take apart, easy to put together again. The feed bin 17 makes it unnecessary to hold or automatically feed the material by any other means than gravity. The material does not clog in the teeth of the cutting disc because the teeth constitute guide surfaces by means of which the cut material may be directed radially outward. Stated in another way, centrifugal force due to the high speed motor, which may be about 3500 R. P. M., acts to prevent clogging or loading of the teeth with cut material. The wide radial space on each side of the teeth gives ample room for the cut material to be thrown out centrifugally.

The centrifugal removal of cut material from between the rasp-like teeth is assisted by the substantial spacing of each tooth from adjacent teeth and the fact that the disc is imperforate to preclude material clogging in the disc. Since the clearance between the teeth and the top wall 11 is small enough to insure the cutting up of leafy materials, the adjustment of this clearance space will to a substantial extent control the fineness of cutting. As shown in the drawings, the space between the edge of the disc 10 and the side walls 12 is much larger than the space between the teeth 21 and the adjacent wall 11 in order to give ample opportunity for the centrifugally discharged cut material to fall by gravity onto the bottom wall 13. As shown, the vanes 20 are of substantially uniform depth. The drawings show how the teeth 21 are arranged not precisely, but only generally radially.

I claim:

1. In a device for cutting food, the combination with a generally horizontal, imperforate, rotatable disc having rasp-like teeth on top thereof, a stationary upper wall close to said teeth, a peripheral wall spaced from the peripheral edge of the disc, a lower wall spaced from the disc on the under side thereof, a vane extending somewhat radially on the under side of said disc, an opening in said stationary upper wall for the supply of material to be cut, an opening in the lower wall below said disc and through which cut material is adapted to be discharged, and means for rotating said disc at a speed such that leaves and the like will be cut between said teeth and upper wall, passed to the edge of the disc by centrifugal force, passed around the edge of the disc and directed to said discharge opening by said vane, and said means for rotating the disc including a motor and casing, a motor shaft on which said disc is mounted, means for clamping said upper wall against said lower wall with the peripheral wall therebetween, and means for adjustably supporting said lower wall from said motor casing, whereby adjustment of said supporting means may control the spacing between said disc and said upper and lower walls.

2. A cutting apparatus comprising a rotatable imperforate disc having rasp-like teeth all extending in the same direction with respect to the rotation of said disc, each tooth being spaced substantially from an adjacent tooth to facilitate the centrifugal discharge of cut material from said teeth, a relatively stationary wall generally parallel to said disc and close to said teeth, a peripheral wall spaced from the edge of the disc a substantially greater amount than spacing between the first mentioned wall and teeth, whereby the cut material thrown off from said disc impinges upon the peripheral wall and passes through the space between it and the disc, and vanes on the opposite side of said disc from said teeth, said vanes being non-radial at least in part, about the same height throughout their length and disposed to direct some of the cut material radially inward, and a discharge passage leading away from a radially inner portion of said disc.

3. A cutting apparatus comprising a rotatable imperforate disc having rasp-like teeth all extending in the same direction with respect to the rotation of said disc, each tooth being spaced substantially from an adjacent tooth to facilitate the centrifugal discharge of cut material from said teeth, a relatively stationary wall generally parallel to said disc and close to said teeth, a peripheral wall spaced from the edge of the disc a substantially greater amount than spacing between the first mentioned wall and teeth, whereby the cut material thrown off from said disc impinges upon the peripheral wall and passes through the space between it and the disc, a support for said disc, and a support for said walls independent of said disc support, and means for adjusting said walls axially with respect to said disc.

4. A cutting apparatus including a rotatable imperforate disc having rasp-like teeth, a motor for driving said disc, said disc being mounted on the shaft of said motor, stationary plates one on each side of said disc, a peripheral wall spacing said plates, a motor casing, and means for adjustably supporting said plates and peripheral wall as a unit from said motor casing whereby said plates may be adjusted relative to said disc to control the fineness of cutting without changing the position of said disc and its drive shaft or the uniformity of spacing between the disc and plates.

5. A cutting apparatus including an imperforate rotatable disc having rasp-like teeth thereon, a stationary plate adjacent said teeth, a stationary plate spaced on the opposite side of said disc from said first plate, a peripheral wall radially spaced from said disc and carried by said second mentioned plate, and means for quickly removing the first mentioned plate and comprising pivotal bolts carried by one of said plates for reception in guide slots carried by the other plate, and nuts on said bolts for clamping the first mentioned plate when said bolts are received in said guide slots, a driving shaft on which said disc is mounted, a stationary support for said plates, and threaded means for adjusting the separation between said stationary support and said plates as a unit, whereby the spacing between said disc and first mentioned plates may be controlled.

6. A cutting apparatus including an imperforate rotatable disc having rasp-like teeth, a stationary plate close to said teeth, means whereby material may be supplied between the plate and disc, a peripheral wall spaced from the edge of the disc a greater amount than said stationary plate whereby cut material may be centrifugally discharged from said disc and then freely moved between the peripheral wall and disc to the opposite side of said disc, and means for feeding such material to a discharge passage.

7. A cutting apparatus having a rotatable imperforate disc provided with rasp-like teeth on one side, a drive shaft for said disc, a stationary support for said shaft, stationary plates arranged one on each side of said disc, means between said stationary support and said plates for adjusting them as a unit with respect to said support, means for quickly separating said plates and including bolts pivoted to one of said plates, guide slots carried by the other plate for receiving said bolts, wing nuts on said bolts for clamping said plates together, a peripheral wall spaced from the edge of the disc and clamped between said plates by said bolts, means for supplying material to the teeth on said disc, means for centrifugally discharging cut material from the teeth on said disc and freely moving the material around an edge of the disc, and means for discharging material which has passed around the edge of the disc said last mentioned means including a vane on the side of said disc opposite said teeth.

GUSTAVE WELANDER.